UNITED STATES PATENT OFFICE.

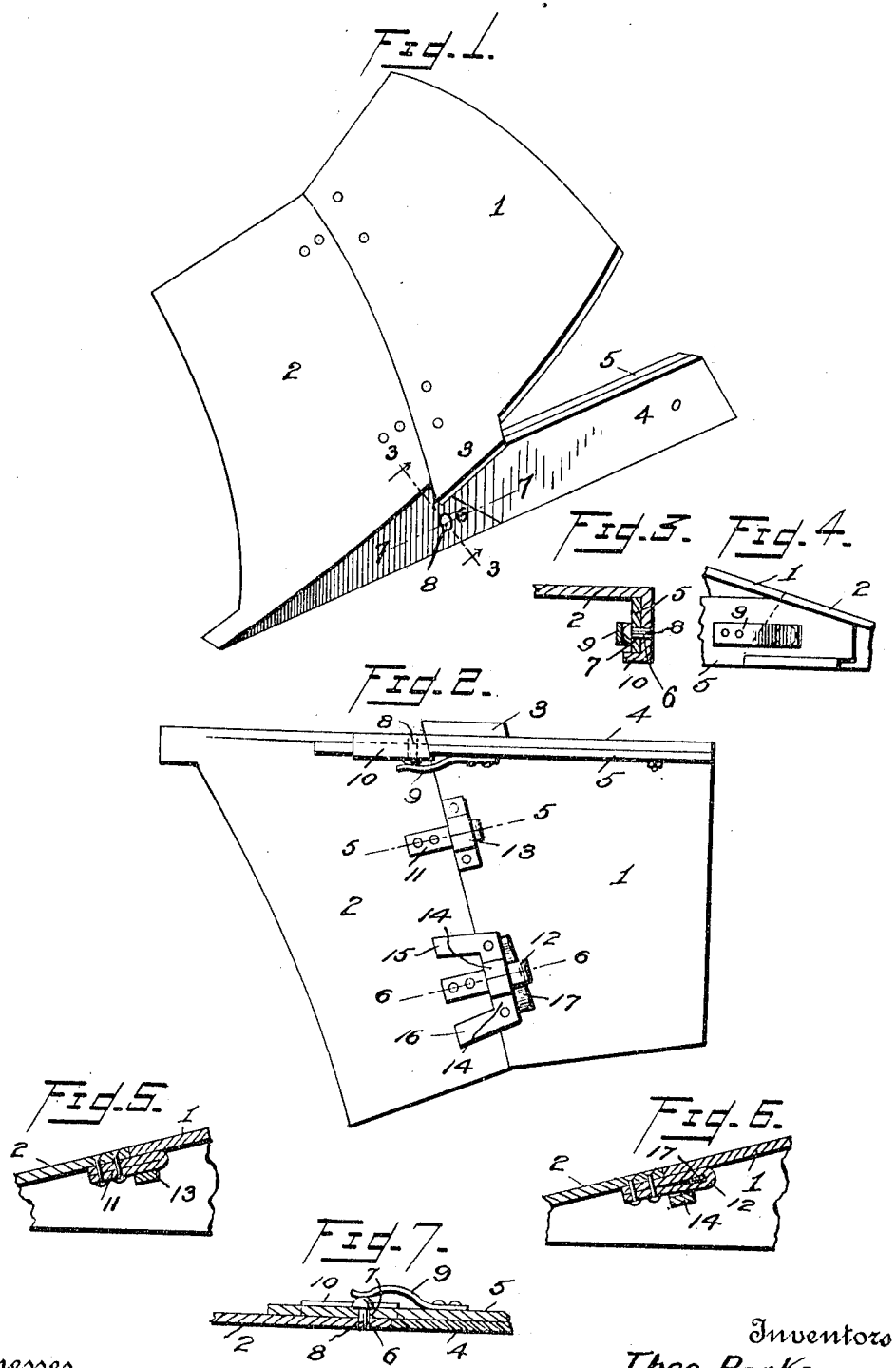

THEODORE PARKS AND JOHN COUGHLIN, OF COLUMBUS, NORTH DAKOTA.

PLOW.

950,674.  Specification of Letters Patent.  Patented Mar. 1, 1910.

Application filed August 25, 1909. Serial No. 514,571.

*To all whom it may concern:*

Be it known that we, THEODORE PARKS and JOHN COUGHLIN, citizens of the United States, residing at Columbus, in the county of Ward and State of North Dakota, have invented certain new and useful Improvements in Plows; and we do declare the following to be a full, clear, and exact description of the invention, such as will enable others skilled in the art to which it appertains to make and use the same.

This invention relates to improvements in plows and particularly to plows provided with means for detachably securing a share to the mold board and the landside.

The object of the invention is to provide a plow having a mold board provided with an improved securing strap for detachably connecting it with the share.

Another object of the invention is to provide improved means for securing the lay to the share.

With these and other objects in view, the invention consists of certain novel features of construction, combination and arrangement of parts as will be more fully described and particularly pointed out in the appended claims.

In the accompanying drawings; Figure 1 is a perspective view of a plow constructed in accordance with this invention; Fig. 2 is a bottom plan view thereof; Fig. 3 is a transverse vertical section taken on the line 3—3 of Fig. 1; Fig. 4 is a side elevation with parts broken out; Fig. 5 is a vertical section taken on the line 5—5 of Fig. 2; Fig. 6 is a similar view taken on the line 6—6 of Fig. 2; and, Fig. 7 is a longitudinal section taken on the line 7—7 of Fig. 1.

In the embodiment illustrated a mold board 1 is shown secured to the rear end of the share 2 by detachable means hereinafter to be described. The front edge of this mold board 1 is provided near its lower end with a longitudinal extension 3 which projects beyond the landside bar 4 and against which the inner edge of said landside bar is designed to rest and be braced thereby. This landside bar 4 is detachably connected with the landside of the share 2 by means of a bracing plate 5 which is bolted at its upper end to the upper end of the landside bar 4 and its lower end is provided with an aperture 6 which registers with an aperture 7 in the landside of the share 2. A bolt 8 extends through these apertures and connects the plate 5 with the share 2 and is held in place by means of a spring 9 here shown in the form of a plate secured at one end to the plate 5 by means of a bolt which passes through the plate 5 and through the landside bar 4. The free end of said spring is arranged to bear on the head of the bolt 8 and hold it reliably against disengagement. The landside of the share 2 is provided on its lower edge with an inturned flange 10 which extends at right angles thereto for a portion of its length and against the inner face of which the lower edge of the plate 5 is designed to bear and be braced thereby.

The mold board 1 is preferably secured to the share 2 by means of longitudinally spaced loops 11 and 12 which extend upwardly from the inner face of the share and are engaged by straps 13 and 14 now to be described.

The strap 13 is connected at opposite ends to the inner face of the mold board near its front end adjacent the lower end thereof and the loop 11 is inserted therein and assists in holding the mold board securely on the share. The strap 14 is preferably made as shown in the form of an inverted U-shaped member secured near the lower edge of the rear end of the mold board on its inner face, the legs 15 and 16 thereof extending below the lower edge of the mold board and overlapping the inner face of the share to form a lateral brace for the mold board. The middle portion of the strap 14 is preferably outstruck to form a guide for the loop 12 which extends upwardly therethrough and is secured to the strap by means of a split key 17 as is clearly shown in Figs. 2 and 6 of the drawings. One member of the key 17 is preferably provided with lateral corrugations which are adapted to securely hold said key in locking position with the loop 11 and the strap 14. By means of these improvements the share and point may be quickly attached or detached from the mold board or landside and the various parts firmly and rigidly braced.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

We claim as our invention.

1. A plow comprising a mold board having an extension at the lower landside edge thereof, a share detachably connected with said mold board, a bracing plate secured to the landside portion of said share, a landside bar mounted on said plate and having its upper edge arranged to bear against the under face of the extension at the lower landside edge of the mold board.

2. A plow comprising a moldboard, a share, a landside bar connected with said share on the landside thereof, means carried by said mold board for engaging said bar, a loop secured at one end to the inner face of the rear end of said share and projecting above the upper edge thereof, an inverted U-shaped strap secured to the inner face of the mold board and having the free ends of its laterally spaced legs depending and overlapping the inner faces of said share to brace it laterally, the cross bar of said U-shaped strap being provided with a guide to receive said loop and a key for locking the loop to the strap.

3. A plow comprising a mold board, a share, a landside bar connected with said share on the land side thereof, a laterally projecting lip carried by said mold board at the lower landside edge thereof, and overlapping said landside bar, longitudinally spaced loops secured at one end to the inner face of said share and projecting above the upper edge thereof, a strap secured to the inner face of the mold board to receive the free end of the inner loop, and an inverted U-shaped strap secured to the inner face of the mold board near its outer end, with its legs overlapping the inner face of said share, to form a lateral brace therefor, and a guide formed on said strap for receiving the free end of the outer loop, and a key for locking the loop to the strap.

4. A plow comprising a share having a vertical landside, a landside bar arranged in alinement with the land side portion of the share, a bracing plate secured to the landside portion of said share, a spring plate secured at one end to said bracing plate, said bracing plate and share having registering apertures therein, and a bolt arranged in said aperture with its head engaged by the free end of said spring plate to hold it against accidental displacement.

In testimony whereof we have hereunto set our hands in presence of two subscribing witnesses.

THEODORE PARKS.
JOHN COUGHLIN.

Witnesses:
J. A. WALTER,
F. A. KEUP.